United States Patent
Benayad-Cherif

(10) Patent No.: US 8,000,831 B2
(45) Date of Patent: Aug. 16, 2011

(54) MULTI MODEL REGISTRATION (MMR) FOR A GALVANOMETER AND LASER SYSTEM

(75) Inventor: Faycal Benayad-Cherif, Lexington, MA (US)

(73) Assignee: Alltec Angewandte Laserlicht Technologie GmbH (US)

( * ) Notice: Subject to any disclaimer, the term of this patent is extended or adjusted under 35 U.S.C. 154(b) by 357 days.

(21) Appl. No.: 12/408,615

(22) Filed: Mar. 20, 2009

(65) Prior Publication Data

US 2010/0017012 A1    Jan. 21, 2010

Related U.S. Application Data

(60) Provisional application No. 61/070,564, filed on Mar. 21, 2008.

(51) Int. Cl.
*G06F 19/00* (2011.01)
*B23K 26/36* (2006.01)

(52) U.S. Cl. ............. 700/166; 700/182; 219/68; 219/83

(58) Field of Classification Search .................... 700/97, 700/98, 166, 182; 219/121.6, 121.67, 121.68, 219/121.69, 121.82, 121.83
See application file for complete search history.

(56) References Cited

U.S. PATENT DOCUMENTS

| | | | |
|---|---|---|---|
| 5,446,835 A | 8/1995 | Iida et al. | |
| 6,476,351 B1 * | 11/2002 | Kaplan et al. | 219/121.68 |
| 7,778,490 B2 | 8/2010 | Quist et al. | |
| 7,865,316 B2 * | 1/2011 | Turner et al. | 702/39 |
| 2003/0024913 A1 * | 2/2003 | Downes et al. | 219/121.68 |
| 2004/0031779 A1 * | 2/2004 | Cahill et al. | 700/166 |
| 2004/0208374 A1 | 10/2004 | Lee et al. | |
| 2006/0110042 A1 | 5/2006 | Onishi et al. | |
| 2006/0147105 A1 | 7/2006 | Lee et al. | |
| 2007/0031993 A1 | 2/2007 | Nemets et al. | |
| 2007/0100492 A1 * | 5/2007 | Idaka et al. | 700/166 |

* cited by examiner

*Primary Examiner* — Charles R Kasenge
(74) *Attorney, Agent, or Firm* — Joseph A. Yosick

(57) ABSTRACT

A multi model registration (MMR) process performed using a computer, for registering a plurality of workpiece vision models representing features on a workpiece that define a marking location thereon, to corresponding part vision models stored on the computer representing features that define a desired part marking location. The MMR process includes capturing a new image of the workpiece that includes one of the plurality of features on the workpiece that define its marking location; generating a workpiece vision model of that one workpiece feature included in the new workpiece image captured; registering the new workpiece vision model generated to the stored part vision model representing the corresponding one of the features defining the part marking location; and repeating these process steps for the remaining workpiece features defining the marking location thereon, for which there is respective corresponding stored part vision model representing a feature defining the part marking location.

19 Claims, 6 Drawing Sheets

STEP B-1 TAKE IMAGE | STEP B-2 EXTRACT VISION MODEL | STEP B-3 GENERATE TRANSFORM | STEP B-4 PASS TRANSFORM TO MARK ENGINE | STEP B-5 LOAD GRAPHICS | STEP B-6 MARK PART

MULTI MODEL REGISTRATION (MMR) FOR A GALVANOMETER AND LASER SYSTEM

CROSS REFERENCE TO RELATED APPLICATION

This application claims the benefit of U.S. Provisional Patent Application Ser. No. 61/070,564, filed Mar. 21, 2008, the entire disclosure of which is expressly incorporated herein by reference.

BACKGROUND OF THE INVENTION

1. Field of the Invention

The subject invention relates to positioning a laser on a part, and utilizing the laser to mark, or otherwise alter the part, to produce, for example, a graphic in or on the part at a desired position.

2. Description of the Related Art

Methods are known for accurately guiding a laser used to mark, etch, engrave, machine, cut, weld, etc. a workpiece in producing a part, the workpiece perhaps being the resulting part itself prior to or during the process of marking. Herein, the term "mark" and its variants are used to refer not only to marking, but to other alterations of the workpiece performed by a laser, such as but not limited to etching, engraving, machining, cutting or welding. In certain procedures, for example, marking entails producing a graphics on the workpiece, using a process of capturing an image of the workpiece, comparing its position and orientation to a preexisting computer-based model of the part and the desired graphics, relatively oriented to their properly aligned positions, and marking the graphics on the workpiece using a laser to match the graphics positioned on the preexisting computer-based model of the part. The parts in the examples to be discussed herein are automobile side view mirror toggle switch cover plates. The toggle switch cover plate may be molded in white plastic, for example, and painted black. The laser is used to remove the black paint (i.e., mark the workpiece) to mark white arrows in spherical depressions or dimples formed in the toggle switch cover plate. The plate may be molded in a translucent white plastic, the arrows of the part thus being visible at night when backlit by a light source beneath or behind the toggle switch plate.

One such known method used in accomplishing such workpiece marking, which may be undertaken with an apparatus or system 20 as shown in FIG. 1, is intelligent mark positioning (IMP). The apparatus or system 20 of FIG. 1 includes a laser 22, an imaging device such as a camera 24, for instance a CCD (charge-coupled device) or a CMOS (complimentary metal-oxide semiconductor) camera and appropriate lighting, a scan head 26 and a computer 28 having an image display screen 30. The scan head may be a conventional galvanometer or a plurality of galvanometers having a mirror or a plurality of mirrors controlled by the computer. The scan head may also include a lens 34. Such devices are well-know to those or ordinary skill in the art, and are not described in detail herein other than to briefly explain that, in a well-known way, the camera "looks" through the scan head and reads or takes an image of a workpiece disposed beneath the scan head, and the image is directed to the computer, which extracts a geometric vision model of the workpiece to be marked (the "workpiece vision model") and compares it to a preexisting, stored vision model of the part (the "part vision model") previously taught to the computer. The part vision model may be of a type having a fixed orientation and position which is continually referred to in registering each new workpiece to be marked (as CAD based registration would employ) or, alternatively, the part vision model may instead be the most recent previous workpiece vision model. Herein, a preexisting CAD-based model, as well as a computer-based model generated/extracted from an image of the part or workpiece, may be referred to as a "vision model" and it is to be understood that that term should be understood to mean either an image-derived vision model, or a CAD-based model.

The image of the workpiece, and the geometric workpiece vision model extracted therefrom include a centrally-located feature $F_C$ in the workpiece/part which, in conjunction with another camera-recognized feature such as, for example, a corner 40 or a circle circumscribed by one of the dimples 42 in the toggle switch cover plate, serve orientation and positioning purposes in registering the single vision model of the workpiece to the single vision model of the part, through a process referred to single model registration (SMR). Centrally-located feature $F_C$, which may be a small projection or recess in the part surface, and the other feature recognized in imaging, model generation and registration, are fiducial features common to the part and workpieces to be marked. In the example toggle switch cover plate 60, any one of the corners 40 or the circles circumscribed by dimples 42 may serve with $F_C$ as a fiducial feature, owing to the part's symmetry. In a nonsymmetrical part, a feature having a unique orientation relative to $F_C$ would preferably be used.

In marking the workpiece, the computer will reorient the galvanometers from a state corresponding to the orientation and position associated with the preexisting part vision model, based on the prior workpiece image, to a state corresponding to the orientation and position associated with the new workpiece vision model, keying on central feature $F_C$ and the other fiducial feature, and then load the graphics and align them with the workpiece vision model, again keying on the fiducial features. The galvanometers then guide the laser beam 50 to the unfixtured workpiece 60 located on the work surface (not shown), for marking the graphics on the workpiece at its present position and orientation, which is variable relative to that represented by the preexisting part vision model.

Practicing IMP in accordance with the prior art entails: (A) a teaching phase, and (B) a registration and mark phase. The teaching phase (A) includes the following steps:

(A-1) Capture an image of a workpiece including its fiducial features (see FIG. 2);

(A-2) Generate a part vision model of the captured workpiece image, including its fiducial features. The generation of the part vision model is done automatically, with software that extracts a geometric model of the part from the captured image (see FIG. 3); and (A-3) Store the part vision model. Alternatively, the user could store a CAD-based part model, eliminating the above steps of capturing an image and generating/extracting a vision model therefrom.

Registration and mark phases (B) include the following steps, with reference to FIG. 4:

(B-1) Capture a new image of the workpiece located on the work surface, including its fiducial features;

(B-2) Generate a new workpiece vision model of the workpiece image, including its fiducial features. Again, the generation of this vision model is done automatically, with software that extracts a geometric model from the new image;

(B-3) Register the new workpiece vision model to the stored part vision model, keying on their respective fiducial features, and generate/extract a transformation matrix which includes position and orientation. Steps B-1 through B-3 relate to the registration phase.

Continuing on to the IMP mark phase, the following steps are carried out, still with reference to FIG. 4:

(B-4) Pass the transformation matrix to the mark engine;
(B-5) Load the graphics; and
(B-6) Mark the workpiece with the graphics using the laser.

A problem with the prior IMP's SMR concept is that it is limited to workpiece features that are visible and detected in the camera field of view, and cannot be applied to featureless parts/workpieces or parts/workpieces where the feature is too large to be detected because it is not visible in the camera view. Although using a vision model far from the mark location is possible, it generates large inaccuracies. Further, SMR is not possible without any feature in the center of the part/workpiece, which is why a fiducial feature such as $F_C$ in the above-described example is necessary. Thus, the SMR concept is limited to laser marking methods where the alignment is based on a feature within the camera's field of view.

It is desirable to mark a part or a feature thereof, for example with a graphic, using a laser, the location of the feature or the mark location being aligned with the center of the part, which itself may be featureless, and overcome inadequacies of the prior IMP process and other prior processes employing SMR concepts, including, for example, their shortcomings related to marking features outside of the camera view.

SUMMARY OF THE INVENTION AND ADVANTAGES

The present invention overcomes the shortcomings of the prior art by providing an alignment approach that combines several vision based geometric models extracted from several 2D images to accurately guide a laser to mark a workpiece. This approach provides a fast and highly accurate alignment approach while eliminating the need to use any fixturing at all, or providing the workpiece with a centrally-located fiducial feature.

In addition to overcoming the shortcomings of the prior art, advantages provided by the inventive multi model registration (MMR) process include its being feature-based, instead of CAD-based. MMR does not require a user to select a specific or known part to be taught. The teach phase can relate to a part/workpiece image taken by a CCD camera, from which a vision model is generated. Alternatively, however, MMR's teach phase can be CAD-based. Moreover, MMR does not require previous knowledge of the part/workpiece to mark it, for the process uses a CCD camera and lighting to define the part/workpiece as well as its position and orientation. Further, MMR can be used with an unlimited number of features to be marked using a laser.

The present invention provides a method for marking a workpiece with a laser in producing a part, including the steps of: teaching a plurality of part vision models to a computer, each part vision model representing a different one of a plurality of fiducial features of the part and of the workpiece; and storing on the computer the taught plurality of part vision models. The method further includes the steps of: capturing a new image of the workpiece that includes at least one of the plurality of fiducial features of the workpiece; generating from the new image of the workpiece captured, a separate, individual workpiece vision model representing a respective one of the plurality of fiducial features of the workpiece included in the new image of the workpiece captured, using the computer; registering the generated separate, individual workpiece vision model representing the respective one of the plurality of fiducial features of the workpiece included in the new image of the workpiece captured, to the stored part vision model of the respectively associated fiducial feature, using the computer; repeating the steps of capturing a new image of the workpiece, generating a separate, individual workpiece model, and registering the generated separate, individual workpiece vision model, for a different one of the plurality of fiducial features of the workpiece, for the remaining respective ones of the plurality of fiducial features of the workpiece; and extracting a transformation matrix TRS including respective position, orientation, and scale relative to the associated workpiece vision models and part vision models, using the computer. The method further includes the steps of: passing the extracted transformation matrix to a mark engine of the computer; and marking the workpiece using the laser.

The present invention also provides a multi model registration process performed using a computer, for registering a plurality of workpiece vision models, each workpiece vision model representing a different one of a plurality of features on the workpiece that define a marking location on the workpiece, to a plurality of corresponding part vision models stored on the computer, each part vision model representing a different one of a selected plurality of features that define a desired part marking location. By this process, respectively corresponding workpiece vision models and part vision models are aligned for guiding a laser to mark the workpiece, the position and orientation of the workpiece being variable relative to that represented by the stored part vision model. The process includes the steps of: capturing a new image of the workpiece including one of the plurality of features on the workpiece that define a marking location on the workpiece; generating a workpiece vision model of the respective one feature on the workpiece included in the new image of the workpiece captured in the prior process step; registering the new workpiece vision model generated to the stored part vision model representing a respective corresponding one of a plurality of features that define a desired part marking location; and repeating the above process steps for each of the remaining ones of the plurality of features on the workpiece that define a marking location on the workpiece for which there is respective corresponding stored part vision model representing a different one of a plurality of features that define a desired part marking location. The inventive multi model registration process further includes a step of extracting a transformation matrix TRS which includes respective position and orientation relative to each respective pair of corresponding workpiece and part vision models.

The present invention also provides a method for marking a workpiece using a laser incorporating the above-described multi model registration process, wherein the multi model registration process is preceded by a teaching process and followed by a marking process performed using the computer. The teaching process may include the steps of: capturing an image of a part including at least one of a selected plurality of features on the part that define a marking location on the part; generating a part vision model of one of the plurality of features on the part that define a marking location on the part image captured; storing the part vision model that represents the respective feature for which the associated part vision model was generated; and repeating the teaching process steps of capturing an image, generating a part vision model, and storing the part vision model for all remaining ones of the selected plurality of features on the part that define a marking location on the part. Alternatively, the teaching process may include loading CAD-based part vision models of each of the selected plurality of features on the part that define a marking location on the part; and storing the CAD-based part vision models. The marking process may include the steps of: passing the transformation matrix to the mark engine; loading marking instructions; and marking the workpiece using the laser in accordance with the marking instructions.

BRIEF DESCRIPTION OF THE DRAWINGS

Advantages of the present invention will be readily appreciated, as the same becomes better understood by reference to the following detailed description when considered in connection with the accompanying drawings wherein.

Figure 1:
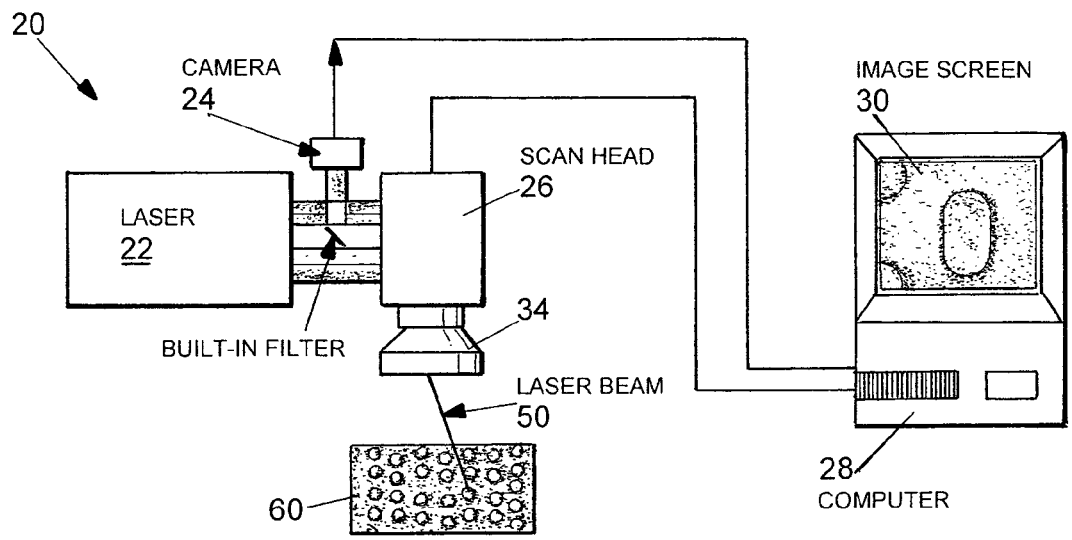
FIG. 1 is a schematic depiction of an apparatus or system for implementing or performing an IMP process and utilizing a laser for marking each of a plurality of non-fixtured workpieces with either SMR according to the prior art, or MMR in accordance with an embodiment of the present invention.

While the invention is susceptible to various modifications and alternative forms, specific embodiments thereof are shown by way of example in the drawings and may herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Moreover, it is to be noted that the Figures are not drawn to scale and are not drawn to the same scale. In particular, the scale of some of the elements of the Figures is greatly exaggerated to emphasize characteristics of the elements. Elements shown in more than one Figure that may be similarly configured have been indicated using the same reference numerals.

DETAILED DESCRIPTION OF THE INVENTION

Figures 2, 3:
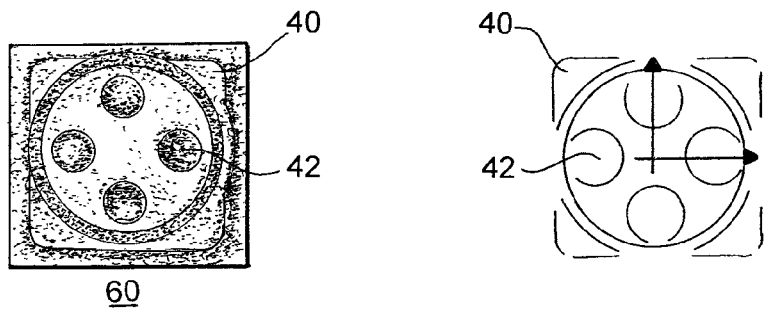
FIG. 2 is a plan view of an image taken by the camera of the apparatus or system of FIG. 1, of a workpiece in accordance with one embodiment of the prior art.
FIG. 3 is a drawing of a vision model extracted from the image represented in FIG. 2, in accordance with the prior art embodiment.
Figure 4:
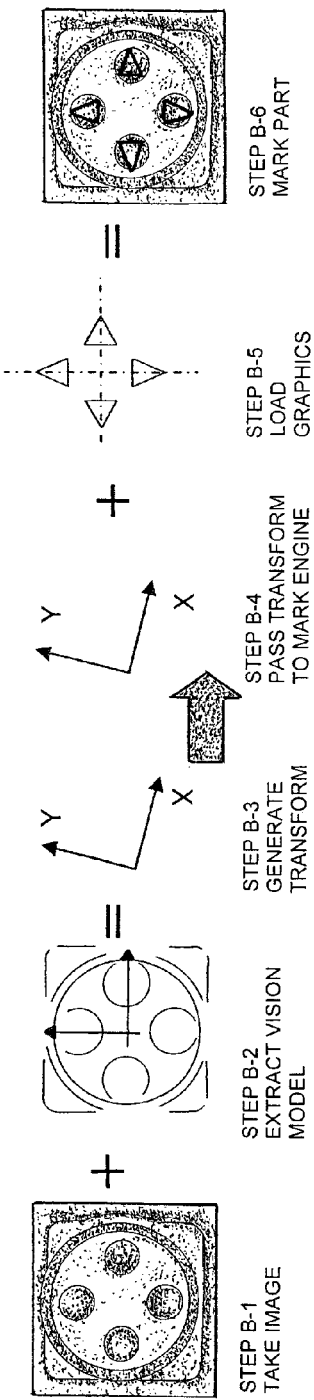
FIG. 4 is a diagram representing the steps of the (single model) registration and mark phases of an IMP process, in accordance with the prior art embodiment.
Figure 6:
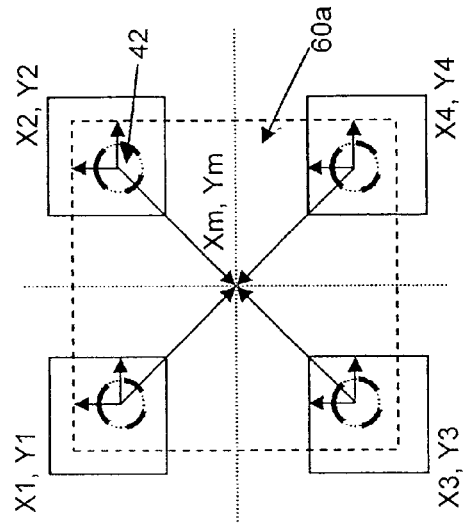
FIG. 6 is a plan view of the part resulting from marking the workpiece of FIG. 5 in accordance with an embodiment of the present invention.
Figure 5:
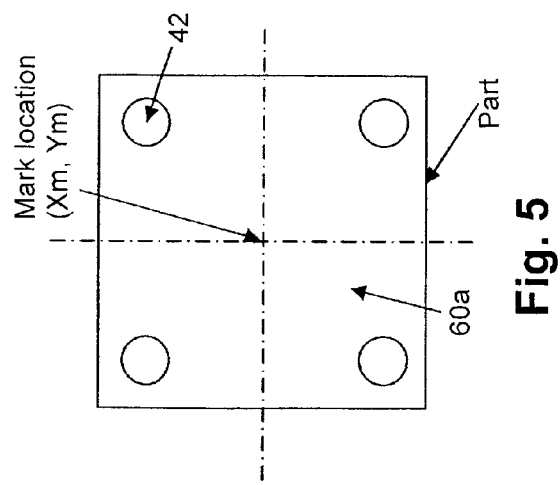
FIG. 5 is a plan view of a workpiece to be marked in accordance with an IMP process utilizing MMR in accordance with an embodiment of the present invention, also indicating a Cartesian coordinate grid for specifying mark location(s) (Xm, Ym)

In FIG. 5 is shown an example toggle switch cover plate workpiece 60a similar to workpiece 60 shown in FIG. 2, on which the user needs to mark each of the plurality of dimples with an arrow, each of the dimples being aligned to the center of the workpiece 60a, which is featureless. As noted above, without any fiducial feature in the center of the workpiece/part 60a (such as $F_C$ in workpiece/part 60, SMR is not possible). Thus, marking the workpiece 60a shown in FIG. 5 is either not possible or impracticable using prior techniques employing SMR. The workpiece 60a shown in FIG. 5 may, however, be marked as the user requires using a laser in accordance with an embodiment of the present invention, resulting a part as shown in FIG. 6. It is to be understood that the depictions in FIGS. 7-10 are rotated 45° relative to those in FIGS. 5 and 6 only to more clearly illustrate what is textually described herein.

Figure 7:
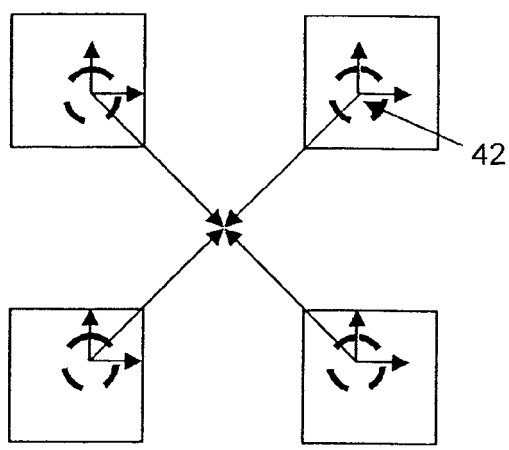
FIG. 7 is a drawing representing a vision model of the workpiece shown in FIG. 5, showing the part vision model taught using multi models in accordance with an embodiment of the present invention.

Referring to FIG. 7, using MMR entails creating several independent vision models (shown in bolded lines) of the fiducial features, one vision model relating to each of the four circles circumscribed in the surface of the toggle switch cover plate 60a by its dimples 42 in the present example (i.e., these recognizable circles are the part/workpiece fiducial features). To each of the several independent vision models is associated a reference location, e.g., (X1, Y1), that is referenced to the mark location (Xm, Ym). The mark location (Xm, Ym) may or may not have a vision model. Each of the geometric positions has a defined X position and Y position. The mark reference can be defined independently of all vision models and can be placed anywhere within the work area. Once fully defined, all reference models including the mark location (Xm, Ym) define the geometrical structure of the MMR.

Relative to the example toggle switch cover plate part shown in FIG. 7, the part vision model includes:

X1, Y1 Vision_Model 1 (shown in bolded lines);
X2, Y2 Vision_Model 2 (shown in bolded lines);
X3, Y3 Vision_Model 3 (shown in bolded lines);
X4, Y4 Vision_Model 4 (shown in bolded lines); and
Xm, Ym (mark location).

Registration happens after either the workpiece has moved or a new workpiece is placed under the scan head. To laser mark the workpiece, the user needs to know the new position and orientation of the workpiece. During registration IMP correctly finds the best alignment fit of all taught locations and records the workpiece fiducial feature location and orientation (xi, yi).

In one embodiment, the system is able to determine, based on the presence and/or relative locations of various features at various locations, whether or not the part is the expected or correct one. Because the system is effectively looking for the presence of certain features at certain locations, the system can either validate or reject a part that it has examined based on the presence and location of detected features. When expected features are detected in expected positions, the system validates the part and concludes that it is the correct one. On the other hand, if the expected features are not detected in their expected relative positions, the system may be configured to reject the part as defective or not acceptable. In yet another embodiment, the system can determine, based on the presence and/or relative locations of various features at various locations, not only whether the part is an expected part, but the system can also determine whether the part is one of several expected parts. Thus, for example, the system may be configured to mark five, or another number, of different parts and it can automatically detect, based on the analysis of the features and their relative position, which of these different parts is put before it. If the system determines that a part is one of the five different parts, it can then proceed to mark that part accordingly. The system can also reject a part if it does not appropriately match any of the five different parts.

Figure 8:
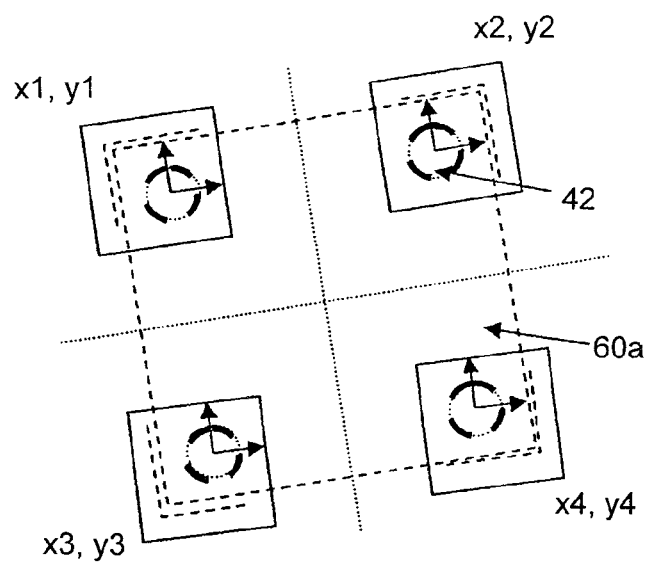
FIG. 8 is a drawing representing the workpiece of FIG. 5 showing all vision models aligned in accordance with an embodiment of the present invention.

The alignment process generates a list of new reference points (xi, yi), at which all part and workpiece vision models are aligned, as shown in FIG. 8:

x1, y1
x2, y2
x3, y3
x4, y4

The point transformation is based on a transformation that includes a translation T, a rotation R and scale factors S. Through a regression process the components of the transformation, T, R and S are found, and the solution consists in resolving X=TRS x.

Figure 9:
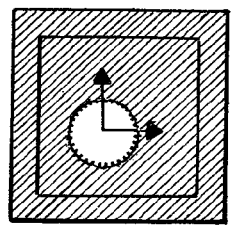
FIG. 9 is a plan view representation of images taken by the camera of the apparatus or system of FIG. 1, of the workpiece of FIG. 5, relating to Step A-1 in accordance with an embodiment of the present invention.
Figure 10A:
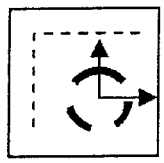
FIGS. 10A-10D are drawings of vision models extracted from images represented in FIG. 9, relating to Step A-2 in accordance with an embodiment of the present invention.
Figure 10B:
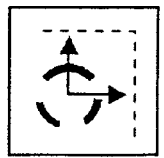
Figure 10C:
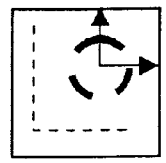
Figure 10D:
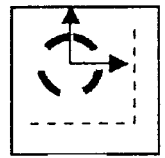

As noted above, practicing IMP entails: (A) a teaching phase, and (B) a registration and mark phase. In accordance with the present invention, employing MMR, the teaching phase (A) includes the following steps:

(A-1) Capture an image of the workpiece, as shown in FIG. 9, relating to the fiducial feature for which part vision model (X1, Y1) (i.e., Vision_Model1) will be taught;

(A-2) Generate part vision model (X1, Y1) (i.e., Vision_Model1) of the captured part image. The generation of the part vision model is done automatically, with software that extracts a geometric part vision model of the part from the captured image, as shown in FIG. 10;

(A-3) Store part vision model (X1, Y1) (i.e., Vision_Model1);

(A-4) Repeat steps A-1, A-2 and A-3 for all remaining fiducial features for which a part vision model will be taught. Thus, in the example embodiment, repeat steps A-1, A-2 and A-3 for each of the remaining fiducial feature part vision models (X2,Y2) (i.e., Vision_Model2), (X3,Y3) (i.e., Vision_Model3) and (X4, Y4) (i.e., Vision_Model4). Alternatively, CAD-based models for each fiducial feature associated with (X1,Y1), (X2,Y2), (X3,Y3) and (X4,Y4) could be stored and used, essentially eliminating the above steps of capturing images and generating vision models therefrom.

Figure 11A:
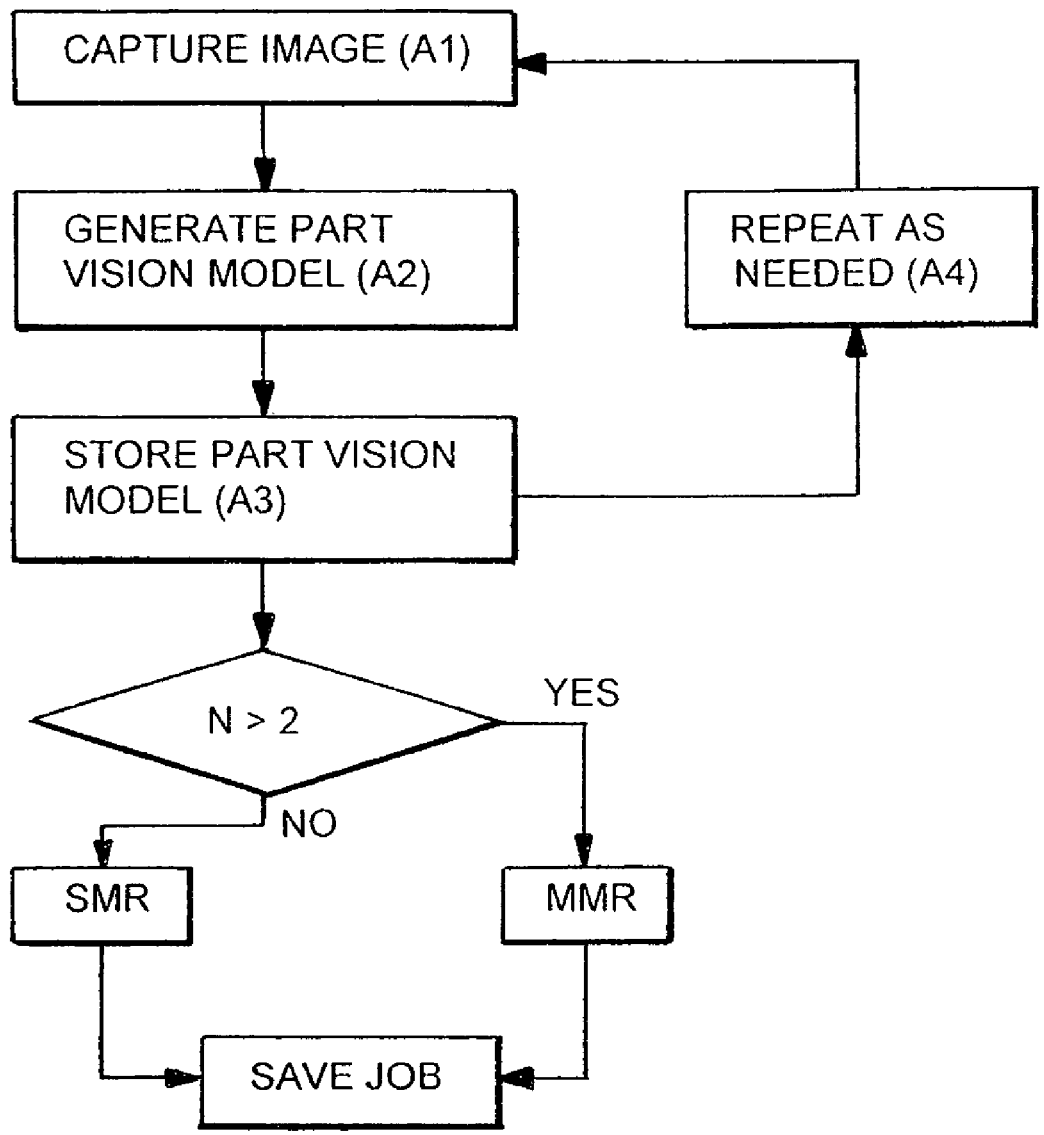
FIG. 11 is a flow diagram describing the (multi model) registration and mark phases of an IMP process, relating to Steps B1 through B8 in accordance with an embodiment of the present invention.
Figure 11B:
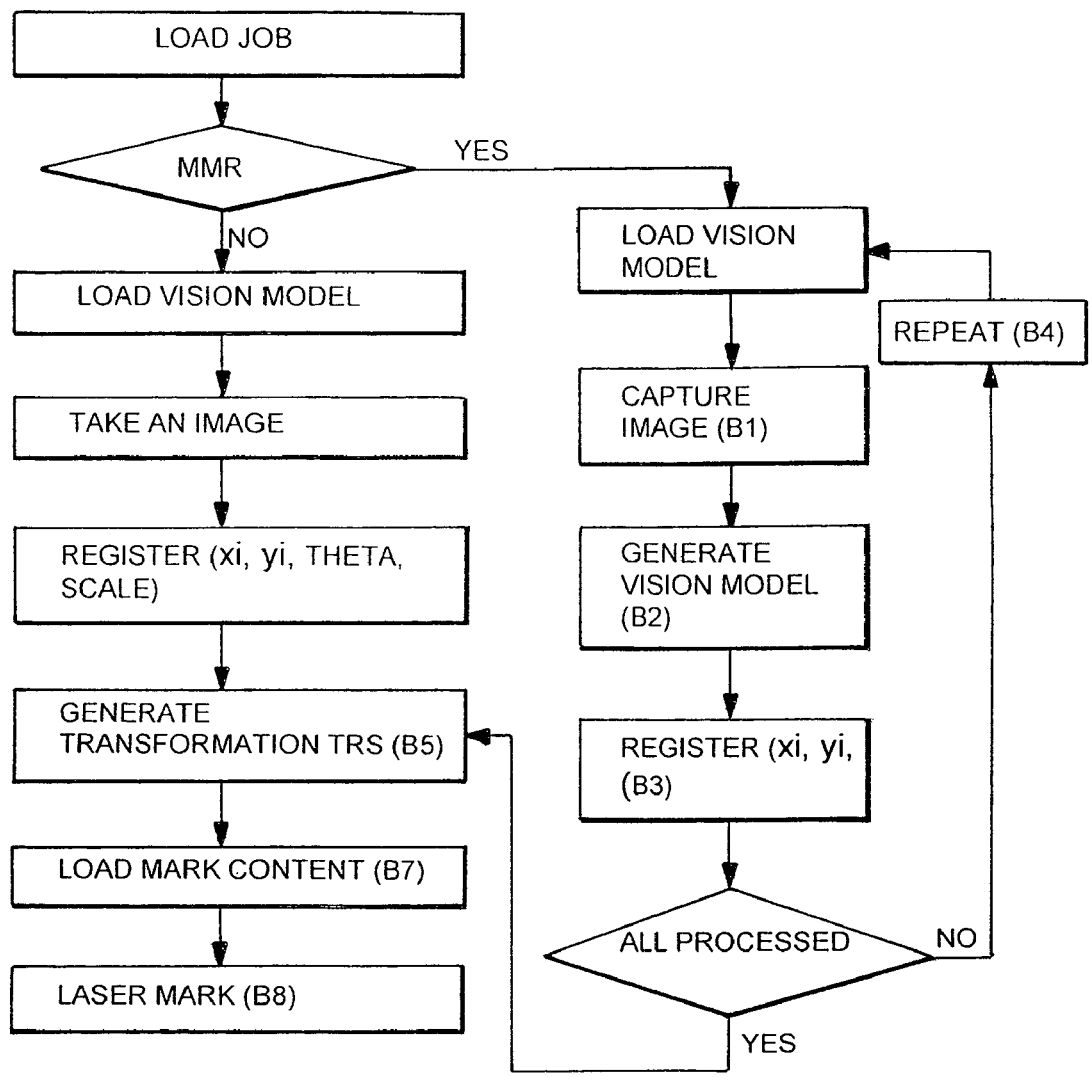

Registration and mark phases (B) include the following steps, with reference to FIG. 11:

(B-1) Capture a new image of the workpiece located on the work surface, relating to the fiducial feature at (x1, y1);

(B-2) Generate workpiece vision model (x1, y1) of the captured workpiece image. The generation of the workpiece vision model is done automatically, with software that extracts a geometric vision model of the workpiece from the captured image;

(B-3) Register the new workpiece vision model (x1, y1) to the respective stored part vision model (X1, Y1) (i.e., Vision_Model1), keying on their respective fiducial features;

(B-4) Repeat steps B-1, B-2 and B-3 for all remaining fiducial features of the workpiece. Thus, in the example embodiment, repeat steps B-1, B-2 and B-3 for each of the remaining fiducial feature workpiece vision models (x2, y2), (x3, y3) and (x4, y4), registering the new workpiece vision model for each respective fiducial feature at (xi, yi) to its respectively associated stored part vision model (Xi,Yi); and (B-5) Generate/extract the transformation matrix TRS which includes respective position and orientation relative to (xi, yi) and (Xi, Yi). Steps B-1 through B-5 relate to the registration phase.

Continuing on to the mark phase, the following steps are carried out, still with reference to FIG. 11:

(B-6) Pass the transformation matrix to the mark engine;
(B-7) Load the graphics; and
(B-8) Mark the workpiece with the graphics using the laser.

Alternatively, in step (B-7) marking instructions other than the graphics to be produced on the workpiece could be loaded, and in step (B-8) the workpiece marked using the laser in accordance with the marking instructions.

As noted above, the inventive process is feature-based instead of CAD-based, although independent CAD models for each fiducial feature, each including the mark location (Xm, Ym) could be stored in the teaching phase in lieu of generating and storing a plurality of part vision models. If employed as a feature-based process, it does not require previous knowledge of the part to mark. Nor does the inventive process require a user to select a specific or known part of the part or workpiece to be taught. Moreover, the present invention can use an unlimited number of fiducial features for registration of the workpiece vision models and part models.

As will be understood by one of ordinary skill in the art, the accuracy of a measurement decreases with distance, and as mentioned above, the prior art IMP method utilizing SMR is limited to "features" that are visible within the field of camera view. As earlier stated, the method of this invention may include the same apparatus or system used with prior art IMP processes, such as that depicted in FIG. 1. However, the method of the present invention is relatively more accurate and may be used to laser mark large work surfaces, which would be too large for the prior art IMP method. For example, the method of the present invention may be advantageously utilized to very accurately locate the laser for marking on large parts such as a vehicle dashboard. In applying the present application to a large part such as this, the scan head of the apparatus or system of FIG. 1 would also include a lens. Thus, its mirrors may be controlled by the computer to capture an image of and accurately locate a plurality of fiducial features on a dashboard, such as, for example, corners of an opening for a radio, mounting holes, etc.

The method of this invention utilizing the apparatus or system of FIG. 1 includes capturing an image of and generating a vision model of a plurality of fiducial features of the workpiece and storing the vision model of each of the fiducial features in the computer in the teaching phase.

Using a greater plurality of fiducial features of the workpiece not only increases the laser positioning accuracy, vis-à-vis prior methods, but also permits use of IMP on larger workpieces where the "marked location" is not within the field of view of the camera. In such cases, the method of this invention then includes taking a new image of the workpiece and extracting a new vision model of a plurality of fiducial features of the workpiece in the registration and mark phase; then marking the workpiece in the desired location using the accurately aligned laser.

In the example side view mirror toggle switch cover plate disclosed above, four features (i.e., the circles circumscribed by the spherical depressions or dimples) are used to locate the laser. However, two or three features may have instead been used.

Having described a preferred embodiment of the MMR method of this invention, it will be understood that various modifications may be made to the disclosed method, including the substitution of a CAD file during the teaching phase, as mentioned herein above, and of other types of scanners or scanner heads than those described in connection with the apparatus or system of FIG. 1.

The present invention has been described herein in an illustrative manner, and it is to be understood that the terminology which has been used is intended to be in the nature of words of description rather than of limitation. Obviously, many modifications and variations of the invention are possible in light of the above teachings. As a non-limiting example, it is envisioned that the MMR process herein described is readily adapted to part and workpiece models defining fiducial feature or fiducial point locations and orientations in three dimensions, rather than in only two dimensions, as described above in connection with the exemplary embodiment, and that registering such features and points can be achieved in a similar manner. It is also to be understood that invention may be practiced otherwise than as specifically described within the scope of the appended claims.

What is claimed is:

1. A method for marking a workpiece with a laser in producing a part, comprising the steps of:
    teaching a plurality of part vision models to a computer, each part vision model representing a different one of a plurality of fiducial features of the part and of the workpiece;
    storing on the computer the taught plurality of part vision models;
    capturing a new image of the workpiece that includes at least one of the plurality of fiducial features of the workpiece;
    generating, from the captured new image of the workpiece, a separate, individual workpiece vision model representing a respective one of the plurality of fiducial features of the workpiece included in the captured new image of the workpiece, with the computer;
    registering the generated separate, individual workpiece vision model representing the respective one of the plurality of fiducial features of the workpiece included in the captured new image of the workpiece, to the stored part vision model of the respectively associated fiducial feature, with the computer;
    repeating said steps of:
        capturing a new image of the workpiece,
        generating a separate, individual workpiece model, and
        registering the generated separate, individual workpiece vision model,
    for a different one of the plurality of fiducial features of the workpiece, for the remaining respective ones of the plurality of fiducial features of the workpiece;
    extracting a mathematical transformation including respective position and orientation relative to the associated workpiece vision models and part vision models, with the computer;
    passing the extracted mathematical transformation to a mark engine of the computer; and
    marking the workpiece using the laser.

2. The method of claim 1, further comprising a step of loading a graphics using the computer, and wherein said step of marking includes marking the workpiece with the graphics using the laser.

3. The method of claim 1, wherein said step of teaching a plurality of part vision models to a computer includes loading CAD-based models, and said step of storing includes storing the CAD-based models.

4. The method of claim 1, wherein said step of teaching includes capturing an image of a workpiece or a part that includes at least one fiducial feature of the plurality of fiducial features of the part and of the workpiece, and generating a part vision model of a fiducial feature included in the image captured in said step of teaching.

5. The method of claim 4, wherein said step of teaching includes capturing an image of a workpiece or a part that includes more than one fiducial feature of the plurality of fiducial features of the part and of the workpiece.

6. The method of claim 5, wherein said step of teaching includes capturing a plurality of images of a workpiece or a part that include more than one fiducial feature of the plurality of fiducial features of the part and of the workpiece, and generating a respective one of the plurality of part vision models representing a different one of a plurality of fiducial features of the part and of the workpiece, from a different one of the plurality of images of a workpiece or a part captured.

7. The method of claim 4, wherein said method comprises executing said steps of teaching and storing for each different one of the plurality of fiducial features of the part and of the workpiece, for the remaining respective ones of the plurality of fiducial features of the part and of the workpiece.

8. The method of claim 1, wherein said step of capturing a new image of the workpiece comprises capturing a new image of the workpiece with an imaging device.

9. The method of claim 8, wherein, in said step of capturing a new image of the workpiece not all fiducial features included in the plurality of fiducial features of the workpiece are visible in a single camera view.

10. The method of claim 1, wherein no fiducial feature is located at the center of the workpiece or part.

11. A multi model registration process performed using a computer, for registering a plurality of workpiece vision models, each workpiece vision model representing a different one of a plurality of features on the workpiece that define a marking location on a workpiece to be marked, to a plurality of corresponding part vision models stored on the computer, each part vision model representing a different one of a selected plurality of features that define a desired part marking location, by which respectively corresponding workpiece vision models and part vision models are aligned for guiding a laser to mark the workpiece, the position, orientation and scale of the workpiece to be marked being variable relative to that represented by the stored part vision model, comprising the steps of:
    capturing a new image of the workpiece to be marked including one of the plurality of features on the workpiece that define a marking location on the workpiece to be marked;
    generating, with the computer a workpiece vision model of the respective one feature on the workpiece to be marked included in the new image of the workpiece to be marked captured in the prior step;
    registering, with the computer the new workpiece vision model generated to the stored part vision model representing a respective corresponding one of a plurality of features that define a desired part marking location;
    repeating the above steps for each of the remaining ones of the plurality of features on the workpiece to be marked that define a marking location on the workpiece to be marked for which there is respective corresponding stored part vision model representing a different one of a plurality of features that define a desired part marking location; and
    extracting, with the computer a mathematical transformation which includes respective position and orientation relative to each respective pair of corresponding workpiece and part vision models.

12. A multi model registration process performed using a computer according to claim 11, wherein said step of capturing a new image of the workpiece to be marked comprises using an imaging device and lighting to capture a new image of the workpiece to be marked, the image being captured by the imaging device and directed to the computer.

13. A multi model registration process performed using a computer according to claim 12, wherein, in said step of capturing a new image of the workpiece to be marked, not all of the plurality of features on the workpiece that define a marking location on the workpiece to be marked are visible in the camera view.

14. A method for marking a workpiece using a laser incorporating the multi model registration process performed using a computer according to claim 11, wherein said multi model registration process is preceded by a teaching process and followed by a marking process performed using the computer, wherein said teaching process comprises the steps of:
  capturing an image of a part including at least one of a selected plurality of features on the part that define a marking location on the part;
  generating a part vision model of one of the plurality of features on the part that define a marking location on the part image captured;
  storing the part vision model that represents the respective feature for which the associated part vision model was generated; and
  repeating the teaching process steps of capturing an image, generating a part vision model, and storing the part vision model for all remaining ones of the selected plurality of features on the part that define a marking location on the part; and
  wherein said marking process comprises the steps of:
    passing the mathematical transformation to the mark engine;
    loading marking instructions; and
    marking the workpiece using the laser in accordance with the marking instructions.

15. A method for marking a workpiece using a laser according to claim 14, by which the workpiece is to be marked with graphics using the laser and wherein, in said marking process, said step of loading marking instructions comprises loading the graphics, and said step of marking the workpiece using the laser in accordance with the marking instructions comprises marking the workpiece with the graphics using the laser.

16. A method for marking a workpiece using a laser incorporating the multi model registration process performed using a computer according to claim 11, wherein said multi model registration process is preceded by a teaching process and followed by a marking process performed using the computer, wherein said teaching process comprises the steps of:
  loading CAD-based part vision models of each of a selected plurality of features on the part that define a marking location on the part; and
  storing the CAD-based part vision models; and
  wherein said marking process comprises the steps of:
    passing the mathematical transformation to the mark engine;
    loading marking instructions; and
    marking the workpiece using the laser in accordance with the marking instructions.

17. A multi model registration process performed using a computer according to claim 11, wherein the center of the workpiece is featureless.

18. The multi model registration process of claim 11, wherein said process includes the steps of validating the geometry of the features on the part and determining whether the part is an expected part.

19. The multi model registration process of claim 11, wherein said process includes the steps of validating the geometry of the features on the part and determining whether the part is one of several expected parts.

* * * * *